(12) United States Patent
Pyo et al.

(10) Patent No.: US 7,881,574 B2
(45) Date of Patent: Feb. 1, 2011

(54) OPTICAL DEVICE

(75) Inventors: Junghyung Pyo, Seoul (KR); Duk-Jun Kim, Daejeon (KR); In-Gyoo Kim, Daejeon (KR); Gyungock Kim, Seoul (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 44 days.

(21) Appl. No.: 12/491,454

(22) Filed: Jun. 25, 2009

(65) Prior Publication Data
US 2010/0150500 A1 Jun. 17, 2010

(30) Foreign Application Priority Data
Dec. 11, 2008 (KR) .................. 10-2008-0125871

(51) Int. Cl.
*G02B 6/34* (2006.01)
(52) U.S. Cl. ............... 385/44; 385/37; 385/50
(58) Field of Classification Search .......... 385/44, 385/50
See application file for complete search history.

(56) References Cited

U.S. PATENT DOCUMENTS

| 7,065,271 B2 | 6/2006 | Zheng et al. |
| 7,412,133 B2 * | 8/2008 | Yoon et al. .................. 385/37 |
| 2004/0037503 A1 | 2/2004 | Hastings et al. |

FOREIGN PATENT DOCUMENTS

| JP | 08-184721 | 7/1996 |
| KR | 1020030029326 A | 4/2003 |
| KR | 1020070061055 A | 6/2007 |

* cited by examiner

*Primary Examiner*—Jerry T Rahll

(57) ABSTRACT

Provided is an optical device, which includes a substrate, a first cladding disposed on the substrate, a first optical waveguide extended in a first direction on the first cladding, and having a first refractive index, a side grating formed in at least one side of the first optical waveguide, a second optical waveguide filling a space of the side grating, extended in a second direction across the first direction on the first cladding, and having a second refractive index, and a second cladding disposed on the second optical waveguide, and having a third refractive index, wherein the first refractive index is greater than the second refractive index, and the second refractive index is greater than the third refractive index.

14 Claims, 6 Drawing Sheets

OPTICAL DEVICE

CROSS-REFERENCE TO RELATED APPLICATIONS

This U.S. non-provisional patent application claims priority under 35 U.S.C. §119 of Korean Patent Application No. 10-2008-0125871, filed on Dec. 11, 2008, the entire contents of which are hereby incorporated by reference.

BACKGROUND OF THE INVENTION

The present invention disclosed herein relates to an optical device, and more particularly, to an optical device using a silicon semiconductor technology.

Recently, many researches are being made on an optical device using a silicon semiconductor technology. The optical device is applied to a silicon-based electronic device, thereby exceeding the speed limit of the interconnection of the electronic device. It is required that the optical device extracts a portion of the light of an optical waveguide or wavelength-selectively extracts it to transmit the extracted light to other optical waveguide, or extracts only a minimum of an optical power to monitor it, in the inside of a chip.

For this, a directional coupler or a ring-resonator filter is used. The devices have limitations in that they must well define the gap between two optical waveguides in process. A coupling efficiency is greatly changed on the small change of the gap. Moreover, the devices have difficulty in extracting only a certain optical power or a certain wavelength. In a case of the ring-resonator filter, since the line width of a filtered optical spectrum is narrow, it is difficult to extract the light of a wide wavelength region.

SUMMARY OF THE INVENTION

The present invention provides an optical device in which a coupling efficiency is maximized.

Embodiments of the present invention provide an optical device including: a substrate; a first cladding disposed on the substrate; a first optical waveguide extended in a first direction on the first cladding, and having a first refractive index; a side grating formed in at least one side of the first optical waveguide; a second optical waveguide filling a space of the side grating, extended in a second direction across the first direction on the first cladding, and having a second refractive index; and a second cladding disposed on the second optical waveguide, and having a third refractive index, wherein the first refractive index is greater than the second refractive index, and the second refractive index is greater than the third refractive index.

In some embodiments, the second optical waveguide may be extended onto the first optical waveguide, and the second cladding may be disposed on the extended second optical waveguide.

In other embodiments, the second cladding may be disposed to contact the first optical waveguide.

In still other embodiments, the second optical waveguide may be a silicon nitride layer or a silicon oxide nitride layer.

In even other embodiments, the first cladding and/or the second cladding may be a silicon oxide layer.

In yet other embodiments, the second optical waveguide may include: a first taper region; a straight line region; and a second taper region, wherein a size of the first taper region may be greater than a size of the straight line region, and the size of the straight line region may be greater than a size of the second taper region.

In further embodiments, the optical device may further include a third optical waveguide spaced apart from the first optical waveguide, wherein the third optical waveguide may contact the second optical waveguide, and the second cladding may be disposed on a portion of the third optical waveguide or over the third optical waveguide.

In still further embodiments, the side grating may be symmetrically disposed in both surfaces of the first optical waveguide.

In even further embodiments, the side grating may include: a first side grating disposed in a one side of the first optical waveguide; and a second side grating disposed in other side of the first optical waveguide, wherein the first and second side gratings are offset by each other within a range of period.

In yet further embodiments, the side grating may be disposed in only a one side of the first optical waveguide.

In yet further embodiments, the side grating may be slopingly disposed in a one side of the first optical waveguide.

In yet further embodiments, the optical device may further include a fourth optical waveguide disposed on a vertical grating formed in the second optical waveguide, wherein the fourth optical waveguide is an optical fiber.

In yet further embodiments, the first and second optical waveguides may be disposed on the same plane.

In other embodiments of the present invention, an optical device includes: a substrate; a first cladding disposed on the substrate; a first optical waveguide extended in a first direction on the first cladding, and having a first refractive index; a first side grating formed in at least one side of the first optical waveguide; a second side grating formed in at least one side of the first optical waveguide to be spaced apart from the first side grating; a second optical waveguide filling a space of the first side grating, extended in a second direction across the first direction on the first cladding, and having a second refractive index; a third optical waveguide filling a space of the second side grating, extended in the second direction across the first direction on the first cladding, and having a third refractive index; and a second cladding disposed on the second and third optical waveguides, and having a fourth refractive index, wherein the first refractive index is greater than the second and third refractive indexes, and the second and third refractive indexes are greater than the fourth refractive index.

BRIEF DESCRIPTION OF THE FIGURES

The accompanying figures are included to provide a further understanding of the present invention, and are incorporated in and constitute a part of this specification. The drawings illustrate exemplary embodiments of the present invention and, together with the description, serve to explain principles of the present invention. In the figures.

DETAILED DESCRIPTION OF PREFERRED EMBODIMENTS

Figure 1A:
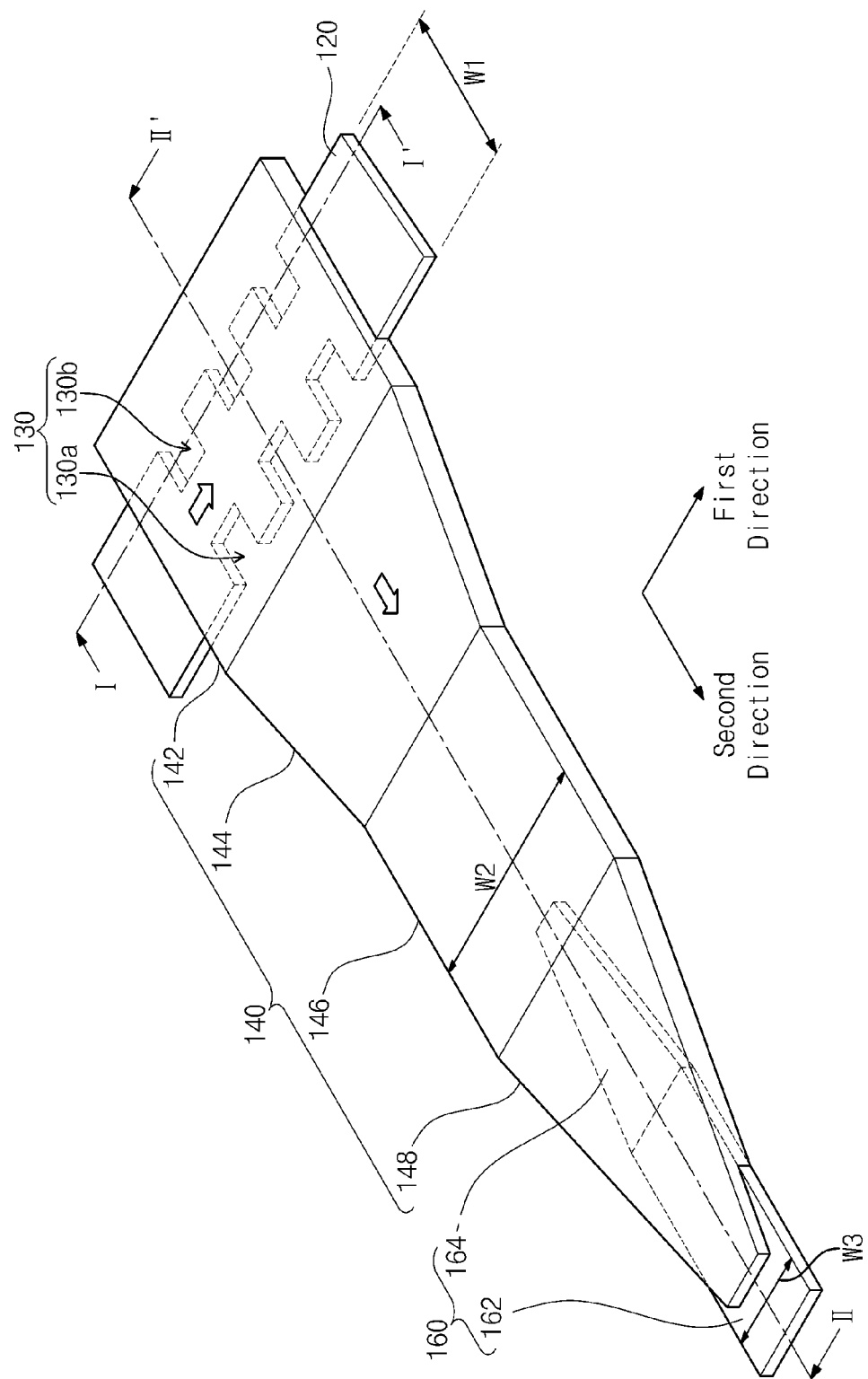
FIGS. 1A to 1C are a perspective view and cross-sectional views illustrating an optical device according to an embodiment of the present invention.

Hereinafter, exemplary embodiments of the present invention will be described in detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art.

In the figures, the dimensions of layers and regions are exaggerated for clarity of illustration. It will also be understood that when a layer (or film) is referred to as being 'on' another layer or substrate, it can be directly on the other layer or substrate, or intervening layers may also be present. Further, it will be understood that when a layer is referred to as being 'under' another layer, it can be directly under, and one or more intervening layers may also be present. In addition, it will also be understood that when a layer is referred to as being 'between' two layers, it can be the only layer between the two layers, or one or more intervening layers may also be present. Like reference numerals refer to like elements throughout.

Figure 1B:
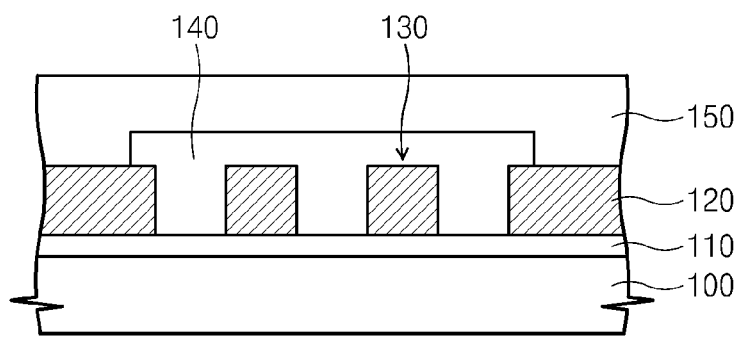
Figure 1C:
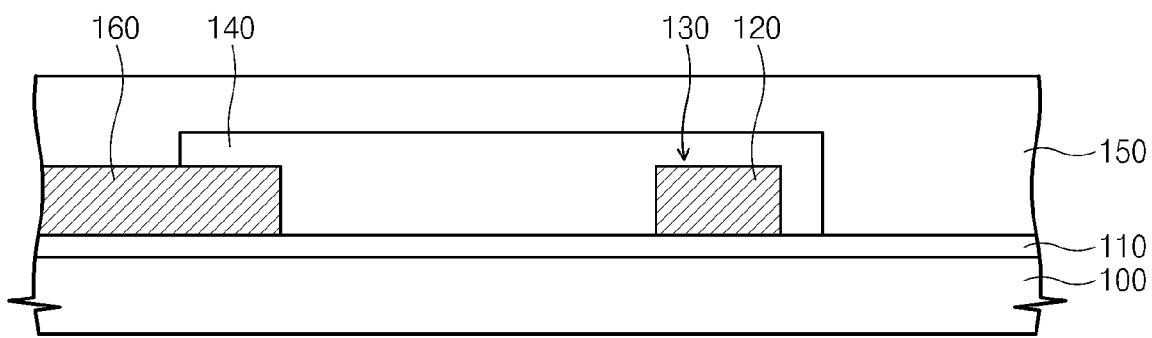

FIGS. 1A to 1C are a perspective view and cross-sectional views illustrating an optical device according to an embodiment of the present invention. FIG. 1B is a cross-sectional view taken along line I-I'. FIG. 1C is a cross-sectional view taken along line II-II'.

Referring to FIGS. 1A to 1C, the optical device may include a substrate 100, a first cladding 110 disposed on the substrate 100, a first optical waveguide 120 extended in a first direction on the first cladding 110 and having a first refractive index, a side grating 130 formed in at least one side of the first optical waveguide 120, a second optical waveguide 140 filling the space of the side grating 130, extended in a second direction across the first direction on the first cladding 110 and having a second refractive index, and a second cladding 150 disposed on the second optical waveguide 140 and having a third refractive index. The first refractive index may be greater than the second refractive index, and the second refractive index may be greater than the third refractive index. The first and second claddings 110 and 120 may be formed of the same material.

The substrate 100 may be at least one of a semiconductor substrate, a glass substrate, a plastic substrate, a Silicon On Insulator (SOI) substrate, a silicon substrate, and a metal substrate. In a case where the substrate 100 is the SOI substrate, the substrate may have the stacked structure of semiconductor substrate/dielectric layer/semiconductor layer. The dielectric layer may correspond to the first cladding 110. The semiconductor layer may be patterned to form the first optical waveguide 120.

The first cladding 110 may be disposed over the substrate 100. The first cladding 110 may be a silicon oxide layer or a silicon oxide nitride layer.

The first optical waveguide 120 extended in the first direction may be disposed on the first cladding 110. The optical waveguide 120 may include at least one of a crystal silicon, a poly crystal silicon and an amorphous silicon. The second refractive index of the optical waveguide 120 may be greater than the first refractive index of the cladding 110.

The side grating 130 may be formed in at least one side of the first optical waveguide 120. The side grating 130 may have a structure in which the width W1 of the optical waveguide is changed by period or non-period. The side grating 130 may comprise a repetitive array of apertures. The side grating 130 may diffract a portion of light propagating in the first optical waveguide 120 in the direction across the propagation direction of the first optical waveguide 120. Alternatively, the side grating 130 may selectively diffract a specific wavelength of light propagating in the first optical waveguide 120. In a case where the SOI substrate is used, the first optical waveguide 120 and the side grating 130 may be formed by patterning the semiconductor layer. The side grating 130 may be symmetrically disposed in the both side surfaces of the first optical waveguide 120. The side grating 130 may include a first side grating 130a disposed in the one side of the first optical waveguide 120, and a second side grating 130b disposed in the other side of the first optical waveguide 120. The period of the first side grating 130a may be the same as that of the second side grating 130b. The side grating 130 may couple a portion of a core mode propagating in the first optical waveguide 120 to other mode propagating in the second optical waveguide 140.

The second optical waveguide 140 may fill the space of the side grating 130 and may advance in the second direction across the first direction. That is, the side grating 130 may include a concave-convex portion in the side of the first optical waveguide 120. The concave-convex portion may include a repetitive apertures. The second optical waveguide 140 may fill the caved portion of the concave-convex portion. The second refractive index of the second optical waveguide 140 may be less than the first refractive index of the first optical waveguide 120. Light diffracted in the side grating 130 may change the propagating direction to propagate to the second optical waveguide 140. The second optical waveguide 140 may be extended to the first optical waveguide 120. The second optical waveguide 140 may include an overlap region 142 which overlaps with the first optical waveguide 120. The second optical waveguide 140 may further include at least one of a first taper region 144, a straight line region 146 and a second taper region 148. The overlap region 142 may be a portion in which light is separated in the first optical waveguide 120. The first taper region 144 may be a region that directs light incident from the overlap region 142 while minimizing its loss. The straight line region 146 may be a region that has a certain width W2 and transfers light to a specific position. The second taper region 148 may be the end portion of the second optical waveguide 148. The second optical waveguide 140 may be a silicon nitride layer or a silicon oxide nitride layer.

The second optical waveguide 140 may be formed by patterning a second optical waveguide layer (not shown) on the substrate 100 on which the first optical waveguide 120 is formed. The second optical waveguide 140 may be a material having etch selectivity to the first optical waveguide 120 and the first cladding 110.

The second cladding 150 having a third refractive index may be disposed on the second optical waveguide 140. Accordingly, the second optical waveguide 140 is interposed between the first and second claddings 110 and 150, thereby serving as a waveguide. The second cladding 150 may be a silicon oxide layer.

According to the modified embodiment of the present invention, the second cladding 150 may be extended to the side of the second optical waveguide 140. Moreover, the second cladding 150 may be disposed on the first optical waveguide 120 in a portion except a region where the second optical waveguide 140 is disposed. Accordingly, a portion of the first optical waveguide 120 may be interposed between the first cladding 110 and the second cladding 150. The refractive index of the first cladding 110 may be the same as that of the second cladding 150.

A third optical waveguide 160 may be disposed on the first cladding 110. The third optical waveguide 160 may contact the second optical waveguide 140. The third optical waveguide 160 and the first optical waveguide 120 may be disposed spaced apart on the same plane. The third optical waveguide 160 and the first optical waveguide 120 may include the same material. The third optical waveguide 160 and the first optical waveguide 120 may be patterned at the same time. The third optical waveguide 160 may include a taper portion 164 and a straight line portion 162. The third optical waveguide 160 may have a fourth refractive index. The fourth refractive index of the third optical waveguide 160 may be greater than the second refractive index of the second optical waveguide 140. Accordingly, the taper portion 164 may be a portion that changes a mode in order for light propagating in the third optical waveguide 140 to propagate to the fourth optical waveguide 160. The angle of the taper portion 164 may depend on the wavelength of light incident to the fourth optical waveguide 160 and the refractive index of each optical waveguide. The taper portion 164 of the third optical waveguide 160 may have a structure in which it is inserted in the inside of the second optical waveguide 140. The width W3 of the third optical waveguide 160 may be narrower than the width W2 of the second optical waveguide 140. The second cladding 150 may be disposed on the third optical waveguide 160. Accordingly, the third optical waveguide 160 may have a structure where the first cladding 110 is disposed under a lower portion thereof and the second cladding 150 is disposed on an upper portion thereof.

FIGS. 2A to 2D are plan views illustrating a side grating according to embodiments of the present invention.

Figure 2A:
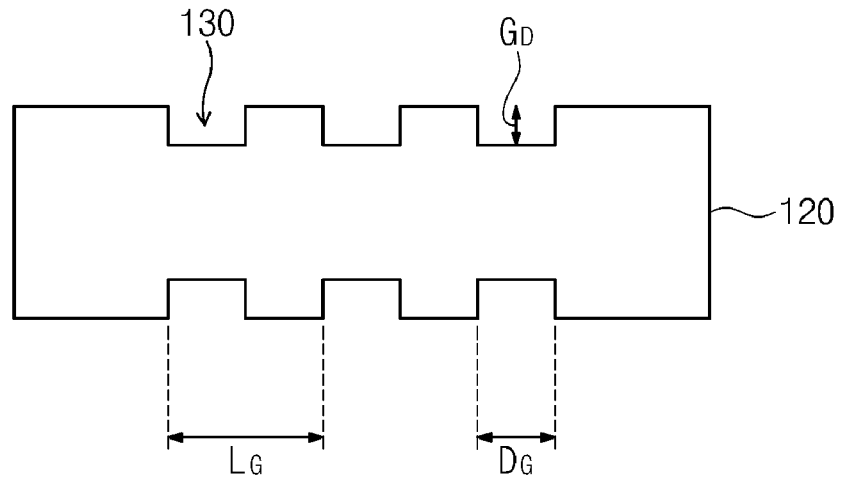
FIGS. 2A to 2D are plan views illustrating a side grating according to embodiments of the present invention.

Referring to FIG. 2A, the side grating 130 may be symmetrically disposed in the both side surfaces of the first optical waveguide 120. According to the structure of the side grating 130 formed in the side of the first optical waveguide 120, the side grating 130 may diffract only a portion or specific portion of light propagating in the first optical waveguide 120 to couple it to a second optical waveguide (not shown). The period $L_G$, groove depth $G_D$, groove width $D_G$ and shape of the side grating 130 may be changed.

Figure 2B:
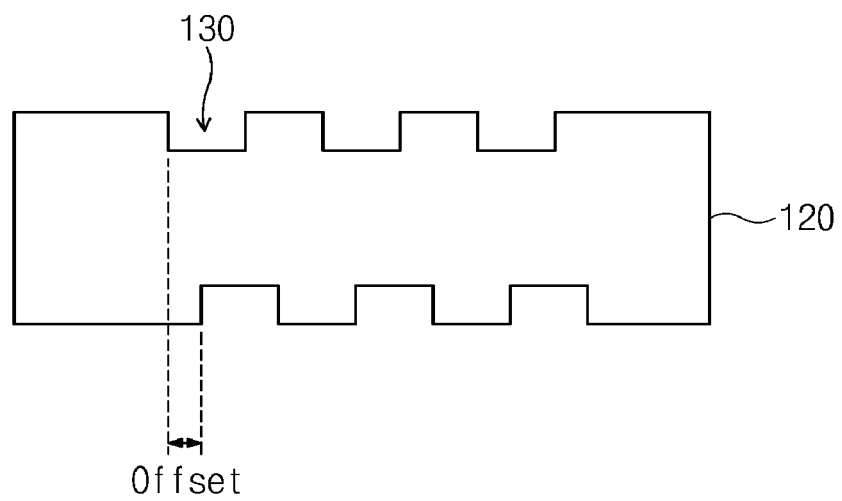

Referring to FIG. 2B, the side grating 130 may be disposed to have an offset in the both side surfaces of the first optical waveguide 120.

Figure 2C:
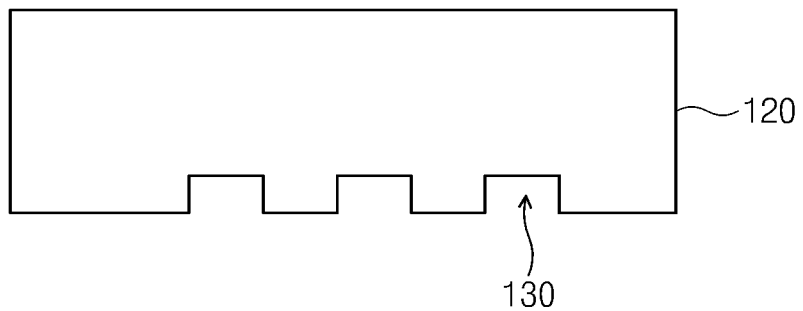

Referring to FIG. 2C, the side grating 130 may be only the one side of the first optical waveguide 120.

Figure 2D:
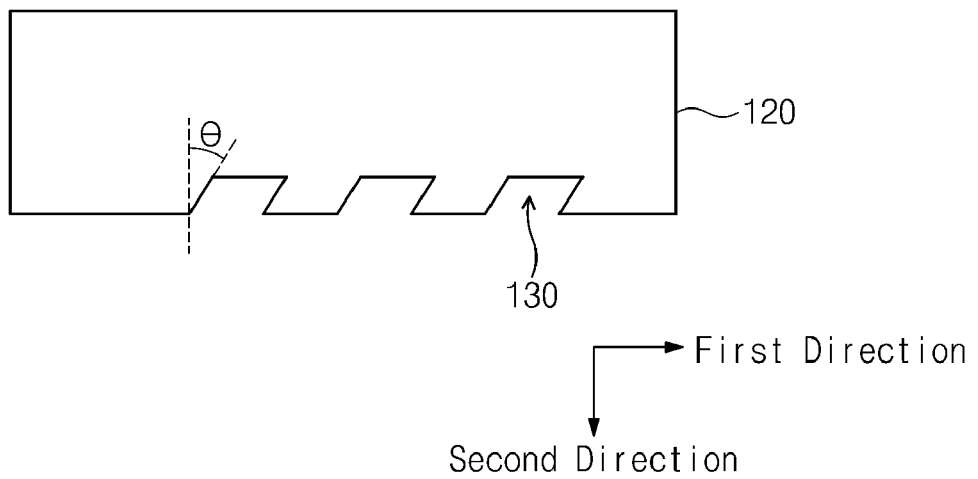

Referring to FIG. 2D, the side grating 130 may be slopingly disposed in the one side of the first optical waveguide 120. The first optical waveguide 120 may advance in the first direction. The slope angle θ between the direction vertical to the advance direction of the first optical waveguide 120 and the plane of the groove of the side grating 130 may be changed.

Figure 3:
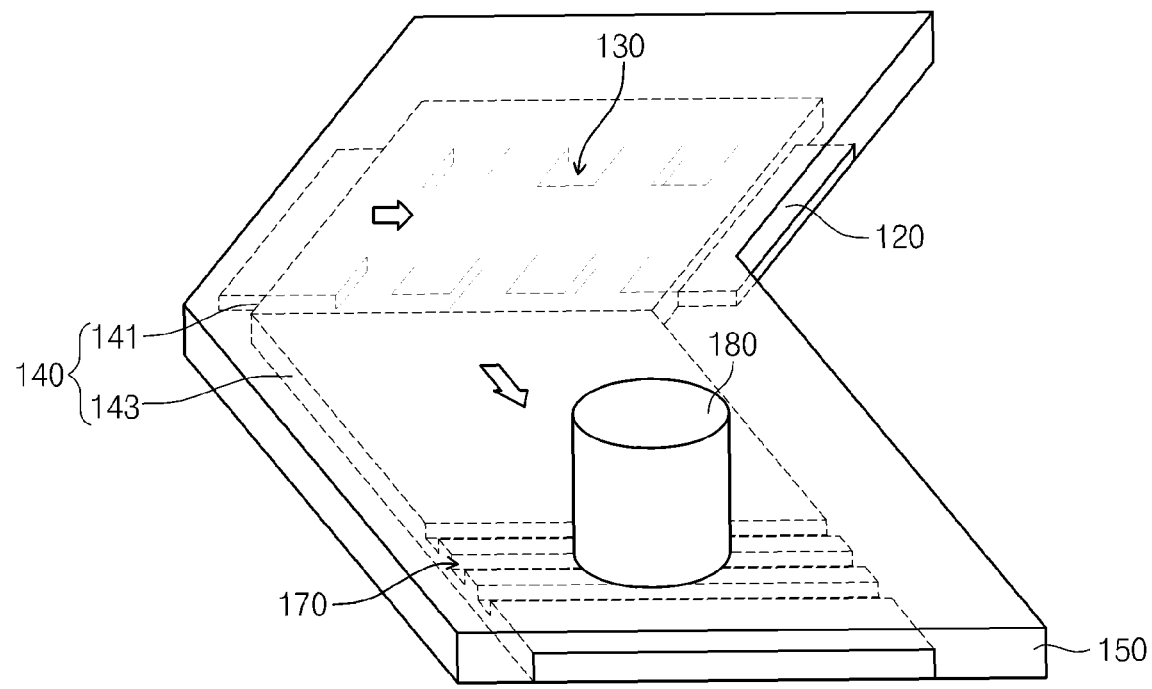
FIG. 3 is a perspective view illustrating an optical device according to another embodiment of the present invention.

FIG. 3 is a perspective view illustrating an optical device according to another embodiment of the present invention. Repetitive description associated with the elements described in FIGS. 1A to 1C will be omitted.

Referring to FIG. 3 and FIGS. 1A to 1C, the optical device may include the substrate 100, the first cladding 110 disposed on the substrate 100, the first optical waveguide 120 extended in the first direction on the first cladding 110 and having the first refractive index, the side grating 130 formed in at least one side of the first optical waveguide 120, the second optical waveguide 140 filling the space of the side grating 130, extended in the second direction across the first direction on the first cladding 110 and having the second refractive index, and the second cladding 150 disposed on the second optical waveguide 140 and having the third refractive index. The first refractive index may be greater than the second refractive index, and the second refractive index may be greater than the third refractive index.

The second optical waveguide 140 may include an overlap portion 141 and an extension portion 143. A vertical grating coupler 170 may be formed in the extension portion 143. The vertical grating coupler 170 may include a plurality of grooves that are extended parallel to a plane on which the second optical waveguide 140 is disposed. The second cladding 150 may fill the grooves. A fourth optical waveguide 180 may be disposed vertically to a plane on which the vertical grating coupler 170 is disposed on. The vertical grating coupler 170 may transfer light propagating in the second optical waveguide 140 to the fourth optical waveguide 180. The fourth optical waveguide 180 may be an optical fiber.

Figure 4A:
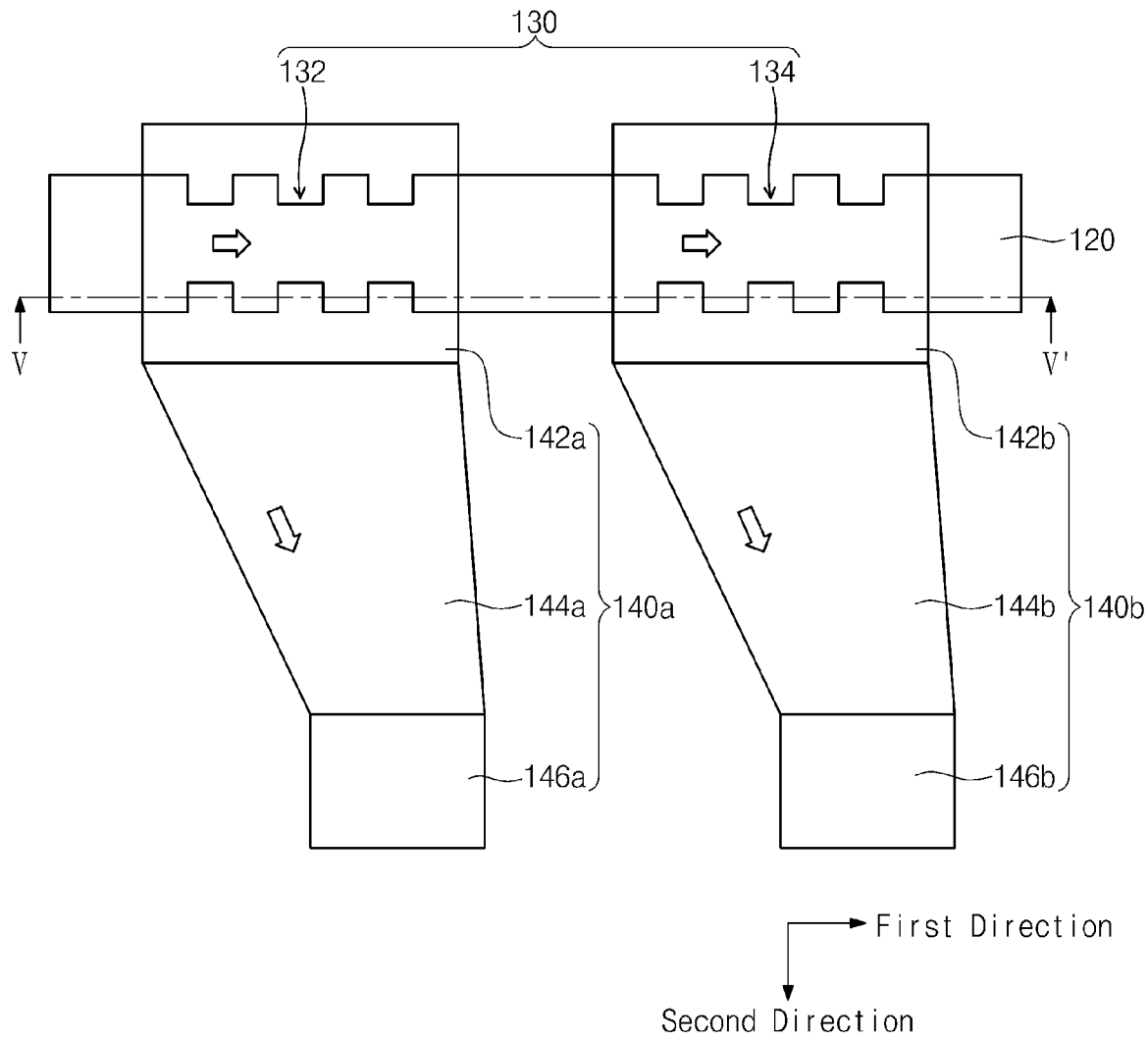
FIGS. 4A and 4B are a plan view and a cross-sectional view illustrating an optical device according to another embodiment of the present invention.
Figure 4B:
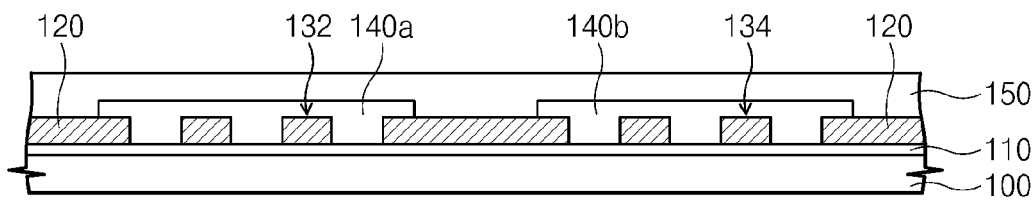

FIGS. 4A and 4B are a plan view and a cross-sectional view illustrating an optical device according to another embodiment of the present invention. FIG. 4B is a cross-sectional view taken along line V-V' of FIG. 4A.

Repetitive description associated with the elements described in FIGS. 1A to 1C will be omitted.

Referring to FIGS. 4A and 4B, the side grating 130 described in FIGS. 1A to 1C may be in plurality. The optical device may comprise a substrate 100, a first cladding 110 disposed on the substrate 100, a first optical waveguide 120 extended in a first direction on the first cladding 110, and having a first refractive index, a first side grating 132 formed in at least one side of the first optical waveguide 120, a second side grating 134 formed in at least one side of the first optical waveguide 120 to be spaced apart from the first side grating 132, a second optical waveguide 140a filling a space of the first side grating 132, extended in a second direction across the first direction on the first cladding 110, and having a second refractive index, a third optical waveguide 140b filling a space of the second side grating 134, extended in the second direction across the first direction on the first cladding, and having a third refractive index, and a second cladding 150 disposed on the second and third optical waveguides 140a, 1140b, and having a fourth refractive index. The first refractive index is greater than the second and third refractive indexes, and the second and third refractive indexes are greater than the fourth refractive index.

The side grating 130 may include the first side grating 132 and the second side grating 134. The side grating 130 may be continuously arranged in the first optical waveguide 120. The first side grating 132 and the second side grating 134 may extract different wavelengths. The first side grating 132 may extract a first wavelength to transfer it to the second optical waveguide 140a. The second side grating 134 may extract a second wavelength to transfer it to the third optical waveguide 140b. The second optical waveguide 140a may include an overlap region 142a, a taper region 144a, and a straight line region 146a. The third optical waveguide 140b may include an overlap region 142b, a taper region 144b, and a straight line region 146b. Each grating structure of the side grating 130 may be designed and formed to be suitable for a wavelength region intended to extract.

The optical device according to embodiments of the present invention selectively extracts a portion of light or a wavelength from the first optical waveguide through the side grating disposed in the side of the optical waveguide and forms the second optical wavelength for the connection of the third optical waveguide, thereby maximizing a coupling efficiency.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An optical device, comprising:
   a substrate;
   a first cladding disposed on the substrate;
   a first optical waveguide extended in a first direction on the first cladding, and having a first refractive index;
   a side grating formed in at least one side of the first optical waveguide;
   a second optical waveguide filling a space of the side grating, extended in a second direction across the first direction on the first cladding, and having a second refractive index; and
   a second cladding disposed on the second optical waveguide, and having a third refractive index,
   wherein the first refractive index is greater than the second refractive index, and the second refractive index is greater than the third refractive index.

2. The optical device of claim 1, wherein the second optical waveguide is extended onto the first optical waveguide, and the second cladding is disposed on the extended second optical waveguide.

3. The optical device of claim 1, wherein the second cladding is disposed to contact the first optical waveguide.

4. The optical device of claim 1, wherein the second optical waveguide is a silicon nitride layer or a silicon oxide nitride layer.

5. The optical device of claim 1, wherein the first cladding and/or the second cladding are a silicon oxide layer.

6. The optical device of claim 1, wherein the second optical waveguide comprises:
   a first taper region;
   a straight line region; and
   a second taper region,
   wherein a size of the first taper region is greater than a size of the straight line region, and the size of the straight line region is greater than a size of the second taper region.

7. The optical device of claim 1, further comprising a third optical waveguide spaced apart from the first optical waveguide,
   wherein the third optical waveguide contacts the second optical waveguide, and the second cladding is disposed on a portion of the third optical waveguide or over the third optical waveguide.

8. The optical device of claim 1, wherein the side grating is symmetrically disposed in both side surfaces of the first optical waveguide.

9. The optical device of claim 1, wherein the side grating comprises:
   a first side grating disposed in a one side of the first optical waveguide; and
   a second side grating disposed in other side of the first optical waveguide,
   wherein the first and second side gratings are offset by each other within a range of period.

10. The optical device of claim 1, wherein the side grating is disposed in only a one side of the first optical waveguide.

11. The optical device of claim 1, wherein the side grating is slopingly disposed in a one side of the first optical waveguide.

12. The optical device of claim 1, further comprising a fourth optical waveguide disposed on a vertical grating formed in the second optical waveguide,
    wherein the fourth optical waveguide is an optical fiber.

13. The optical device of claim 1, wherein the first and second optical waveguides are disposed on the same plane.

14. An optical device, comprising:
    a substrate;
    a first cladding disposed on the substrate;
    a first optical waveguide extended in a first direction on the first cladding, and having a first refractive index;
    a first side grating formed in at least one side of the first optical waveguide;
    a second side grating formed in at least one side of the first optical waveguide to be spaced apart from the first side grating;
    a second optical waveguide filling a space of the first side grating, extended in a second direction across the first direction on the first cladding, and having a second refractive index;
    a third optical waveguide filling a space of the second side grating, extended in the second direction across the first direction on the first cladding, and having a third refractive index; and
    a second cladding disposed on the second and third optical waveguides, and having a fourth refractive index,
    wherein the first refractive index is greater than the second and third refractive indexes, and the second and third refractive indexes are greater than the fourth refractive index.

* * * * *